Feb. 25, 1958 H. A. YARROW 2,824,376
ELECTRICAL MICROMETER USING A RESISTANCE BRIDGE
Filed Jan. 28, 1954 2 Sheets-Sheet 1

Harry A. Yarrow
INVENTOR.

BY
Attorneys

Feb. 25, 1958 H. A. YARROW 2,824,376
ELECTRICAL MICROMETER USING A RESISTANCE BRIDGE
Filed Jan. 28, 1954 2 Sheets-Sheet 2
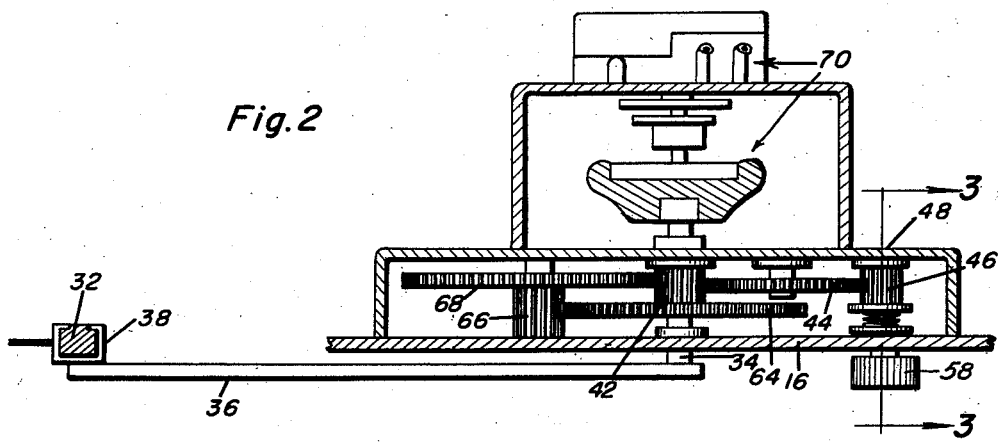
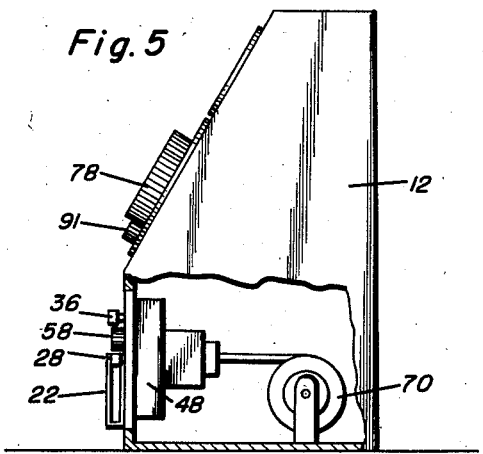
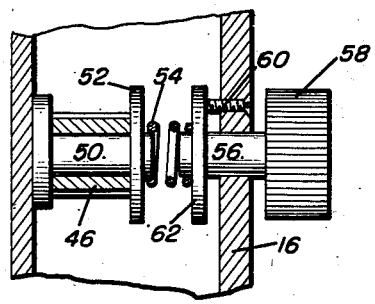
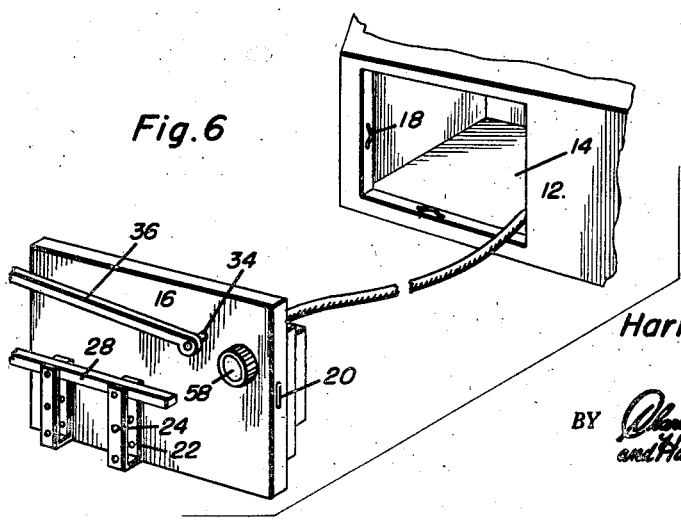
Harry A. Yarrow
INVENTOR.

2,824,376

ELECTRICAL MICROMETER USING A RESISTANCE BRIDGE

Harry A. Yarrow, Sun Valley, Calif.

Application January 28, 1954, Serial No. 406,656

2 Claims. (Cl. 33—147)

This invention relates to measuring apparatus and more particularly to a novel electric micrometer of unexpectedly accurate construction which is especially easy to operate.

The construction of this invention features a plate which is detachably secured in a casing of the micrometer and which adjustably carries a lower caliper arm. On this caliper arm there is provided a guide and slidably received over the guide is a slide attached to an upper caliper arm controlled by rotation of a shaft. The shaft is coupled to a potentiometer which unbalances a resistance bridge. Variable resistors are incorporated in the resistance bridge and directly coupled to knobs provided with indicator plates. The variable resistors are so calibrated that movement of the indicator plates will compensate for the unbalance in the resistance bridge.

Incorporated in the invention is means for enabling the device to be utilized for both inside diameters and for external diameters and for external measurements.

One of the features of the invention resides in the control of the accuracy of the measurements by the micrometer by utilization of means for controlling the sensitivity of the galvanometer.

Still further objects and features of this invention reside in the provision of an electric micrometer that is comparatively simple in construction and manufacture, composed of relatively inexpensive and readily available parts, and which is highly accurate in its measurements.

These, together with the various ancillary objects and features of the invention which will become apparent as the following description proceeds, are attained by this micrometer, a preferred embodiment of which has been illustrated in the accompanying drawings, by way of example only, wherein:

Figure 2 is a sectional detail view illustrating the construction of the means utilized for operating the upper caliper arm while actuating the potentiometer;

Figure 3 is a sectional detail view as taken along the plane of line 3—3 in Figure 2;

Figure 5 is a side elevational view of the apparatus with parts thereof being broken away to show other parts in detail; and Figure 6 is an exposed perspective view illustrating the manner in which the plate is resiliently mounted in the casing.

Figure 1:
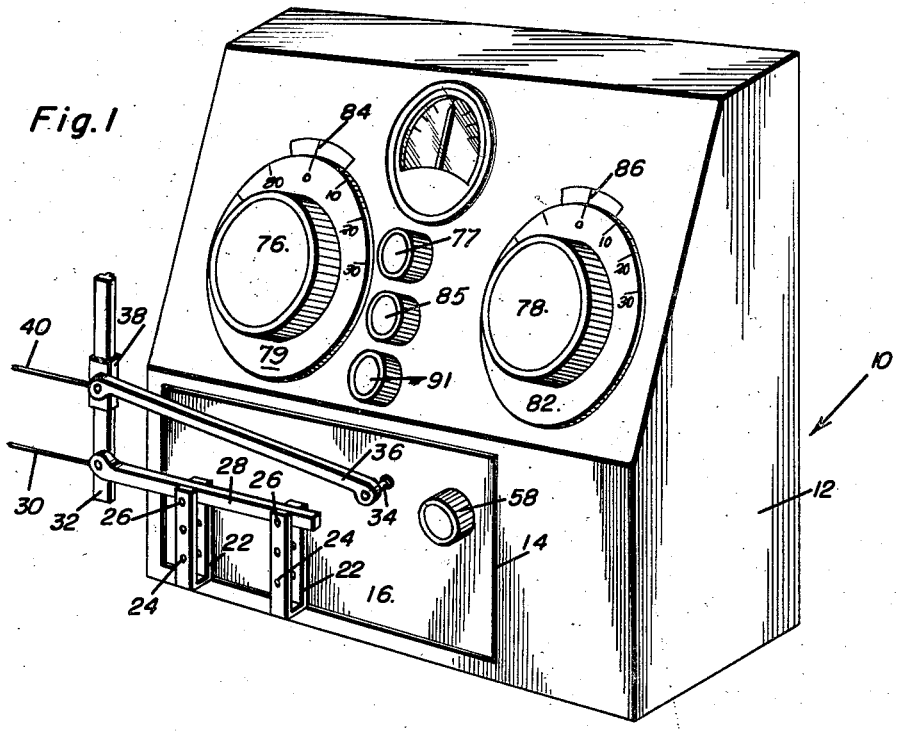
Figure 1 is a perspective view of the electric micrometer comprising the present invention.
Figure 4:
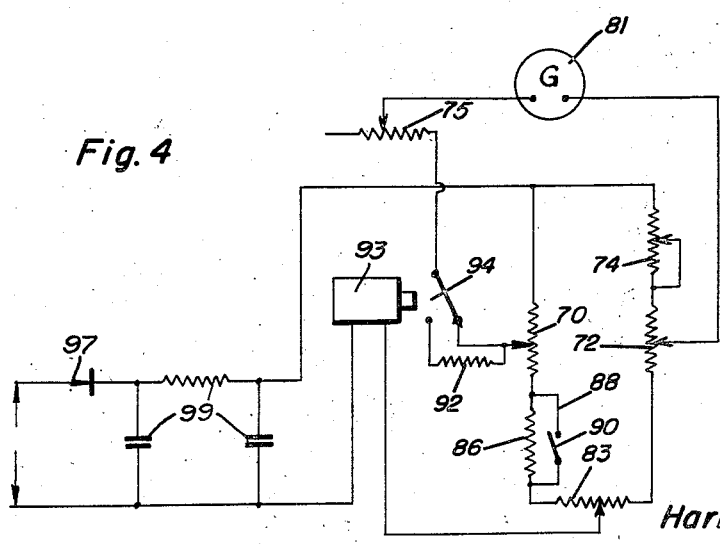
Figure 4 is a schematic wiring diagram of the invention.

With continuing reference to the accompanying drawings wherein like reference numerals designate similar parts throughout the various views, reference numeral 10 generally designates the electric micrometer comprising the present invention which includes a casing 12 having an opening 14 therein for reception of a mounted plate 16. Resilient clips as at 18 are provided for holding the plate 16 in position, the plate being provided with recesses or depressions 20 in which the clips 18 can seat.

Attached to the plate 16 are a pair of U-shaped members or supports 22 having aligned apertures as at 24 therethrough. Detachably secured in the apertures 24 are pins as at 26 which hold a lower caliper arm 28 having a lower finger 30 appended thereto. Also carried by the lower caliper arm 28 is a guide 32.

A shaft 34 is journalled in the plate 16 and has affixed thereto and mounted thereon an upper caliper arm 36 which has pivotally attached thereto a slide 38 which as can be best seen in Figure 2 is adapted to slidingly engage the guide 32 in an embracing manner. An upper finger 40 is appended to the arm 36. It is recognized that the guide 32 may pivot with respect to the arm 28 to prevent binding and this pivotal action is taken into account in the calibration of the device.

The object to be measured may be positioned between the fingers 30 and 40 or as will be henceforth understood the fingers 30 and 40 may measure the internal diameter of an object.

The shaft 34 has mounted thereon a driven gear 42 which is driven through a gear 44 which is in mesh with a gear 46 mounted on a suitable shaft journalled in a housing 48 attached to the plate 16. This shaft journalled to the casing 48 is generally designated by reference numeral 50 and can be best seen in Figure 3. A collar 52 is mounted on the shaft 50 and attached to the shaft is one end of a spring 54.

The other end of the spring 54 is attached to a stub shaft 56 journalled in the plate 16 which is controlled by a knob 58. A set screw 60 is threadedly engaged in the plate 16 and is used as an adjustment screw for controlling the stress on the spring 54. A collar 62 is mounted on the shaft 56 and is engaged by the set screw 60.

A gear 64 is also mounted on the shaft 34 and drives an idler gear 66 having a component element 68 which meshes with the gear 42 driving gear 42 to thus provide a positive drive for the gear 42 and hence the shaft 34 on either movement of knob 58 or of arm 36.

The shaft 34 is directly coupled to a potentiometer generally indicated by reference numeral 70, which forms one of the resistors of a resistance bridge. Variable resistors 72 and 74 respectively are directly coupled to shafts controlled by knobs 76 and 78 mounted on the casing 12, the knobs 76 and 78 having indicator plates 79 and 82 affixed thereto which in conjunction with indicators 84 and 86 are adapted to indicate the decimal parts of units of a measurement. Thus, when the resistances are chosen for measurement in inches the plate 79 will enable the reading of tenths and hundredths of inches while the plate 82 will enable the reading of thousandths and ten thousandths of inches. The resistance bridge is connected through a variable resistor 75 to a galvanometer 81. The variable resistor 75 is controlled by actuation of the knob 77 mounted on the casing 12. This variable resistor thus controls the accuracy of the measurements by controlling the sensitivity of the galvanometer 81. Means are provided for adjusting the calibration of the micrometer to the galvanometer by balancing the bridge circuit when the calipers are in such position that the fingers 30 and 40 are spaced at a specific unit of measurement. Thus, they may be parted by one unit of measurement when they are in the position indicated in Figure 1 but when the arm 28 is carried in the U-shaped support by the pins 26 being engaged in the next set of apertures 24, the micrometer may be brought to calibration utilizing means which include a variable resistor 83 controlled by a knob 85 mounted on the casing 12.

Another resistance 86 is arranged in series connection between the resistances 70 and 83 and may be by-passed by a shunt 88 utilizing a switch 90 when it is desired to utilize the fingers 30 and 40 for measuring inside diameters, the resistance 86 being of such value as to compensate for the thickness of the fingers 30 and 40. The switch is controlled by knob 91.

There is provided a resistance 92 for protecting the galvanometer 81 from overload and a solenoid 93 actuated relay 94 is incorporated in the circuit so as to automatically place the resistance 92 in series connection with the galvanometer 81 and the power supply when the current is too high to be carried safely by the galvanometer 81. Alternating current is supplied and is rectified by rectifier 97 and then passed through filter 99.

Since from the foregoing the construction and advantages of this electric micrometer are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. In an electric micrometer for measuring the dimensions of objects; a casing, a mounting plate adapted to be carried by said casing, a pair of U-shaped supports secured to said plate, a first caliper arm, means adjustably securing said first caliper arm to said supports, a guide rod carried by said first caliper arm, a shaft journalled in said plate, a second caliper arm mounted on said shaft, a slide secured to said second caliper arm, said slide engaging said guide rod, and means for rotating said shaft to adjust said second caliper arm with respect to said first caliper arm.

2. In an electric micrometer for measuring the dimensions of objects; a casing, a mounting plate adapted to be carried by said casing, a pair of U-shaped supports secured to said plate, a first caliper arm, means adjustably securing said first caliper arm to said supports, a guide rod carried by said first caliper arm, a shaft journalled in said plate, a second caliper arm mounted on said shaft, a slide secured to said second caliper arm, said slide engaging said guide rod, and means for rotating said shaft to adjust said second caliper arm with respect to said first caliper arm, a potentiometer connected to said shaft, said shaft upon rotation actuating said potentiometer, an electrical resistance bridge, said potentiometer forming one resistance of said electrical resistance bridge, a galvanometer, said resistance bridge controlling said galvanometer, direct reading indicators and variable resistors incorporated in said resistance bridge coupled to said direct reading indicators for compensating for an unbalance of said resistance bridge caused by rotation of said shaft.

References Cited in the file of this patent
UNITED STATES PATENTS

| 130,784 | Bartram | Aug. 27, 1872 |
| 1,688,330 | Gunther et al. | Oct. 23, 1928 |
| 2,249,477 | Kuehni | July 15, 1941 |
| 2,445,455 | Rights et al. | July 20, 1948 |
| 2,588,431 | Swanson | Mar. 11, 1951 |